United States Patent
Rho et al.

(10) Patent No.: US 10,498,207 B2
(45) Date of Patent: Dec. 3, 2019

(54) RESOLVER OFFSET CORRECTION DEVICE AND METHOD OF ECO-FRIENDLY VEHICLE

(71) Applicants: Hyundai Motor Company, Seoul (KR); Kia Motors Corporation, Seoul (KR)

(72) Inventors: Jeong Won Rho, Seoul (KR); Young Un Kim, Gyeonggi-do (KR); Jae Sang Lim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/051,953

(22) Filed: Aug. 1, 2018

(65) Prior Publication Data
US 2019/0157957 A1 May 23, 2019

(30) Foreign Application Priority Data
Nov. 21, 2017 (KR) .................. 10-2017-0155239

(51) Int. Cl.
| | |
|---|---|
| *G05B 19/31* | (2006.01) |
| *H02K 24/00* | (2006.01) |
| *B60L 3/00* | (2019.01) |
| *B60L 15/02* | (2006.01) |
| *G01D 3/036* | (2006.01) |
| *G01L 3/10* | (2006.01) |
| *G05B 19/404* | (2006.01) |
| *H02P 21/00* | (2016.01) |
| *G01D 5/20* | (2006.01) |
| *G01D 18/00* | (2006.01) |

(52) U.S. Cl.
CPC ............ *H02K 24/00* (2013.01); *B60L 3/0023* (2013.01); *B60L 15/025* (2013.01); *G01D 3/0365* (2013.01); *G01D 5/20* (2013.01); *G01D 18/00* (2013.01); *G01L 3/109* (2013.01); *G05B 19/404* (2013.01); *H02P 21/00* (2013.01)

(58) Field of Classification Search
CPC .............................. H02K 24/00; B60L 3/0023
USPC ................................................ 318/605, 400.4
See application file for complete search history.

(56) References Cited

U.S. PATENT DOCUMENTS

| | | | | |
|---|---|---|---|---|
| 10,259,450 | B1 * | 4/2019 | Lim | .................. H02P 6/153 |
| 2014/0292239 | A1 * | 10/2014 | Kato | .................. H02P 21/0017 |
| | | | | 318/400.02 |
| 2015/0158396 | A1 * | 6/2015 | Walters | .................. H02P 6/16 |
| | | | | 701/22 |
| 2016/0043614 | A1 * | 2/2016 | Stefani | .................. B60L 15/025 |
| | | | | 318/400.39 |

FOREIGN PATENT DOCUMENTS

EP    3 446 914 A1    2/2019

* cited by examiner

*Primary Examiner* — Erick D Glass
(74) *Attorney, Agent, or Firm* — Mintz Levin Cohn Ferris Glovsky and Popeo, P.C.; Peter F. Corless

(57) ABSTRACT

A device and method for correcting a resolver offset of an eco-friendly vehicle is provided. The device and method are capable of correcting the resolver offset based on an angle of torsion occurring in a shaft of a motor rotor. Accordingly, the resolver offset is corrected more accurately.

9 Claims, 5 Drawing Sheets

RESOLVER OFFSET CORRECTION DEVICE AND METHOD OF ECO-FRIENDLY VEHICLE

CROSS-REFERENCE TO RELATED APPLICATION

This application claims under 35 U.S.C. § 119(a) the benefit of priority to Korean Patent Application No. 10-2017-0155239 filed on Nov. 21, 2017, the entire contents of which are incorporated herein by reference.

BACKGROUND

(a) Technical Field

The present disclosure relates to a resolver offset correction device and method of an eco-friendly vehicle, and more particularly, to a device and method for correcting a resolver offset of an eco-friendly vehicle, that corrects the resolver offset based on an angle of torsion occurring in a shaft of a motor rotor.

(b) Background Art

Eco-friendly vehicles refer to electric vehicles, hybrid electric vehicles or fuel cell electric vehicles that improve fuel efficiency and reduce exhaust gas unlike existing internal combustion engine vehicles. An eco-friendly vehicle generally includes a motor as a driving source. For control of the motor, the position of a motor rotor should be accurately detected. Accordingly, to detect the speed of the motor and the absolute position (angle) of the rotor, a resolver is used as a position sensor. In general, the resolver is mounted on the shaft of the motor rotor.

When the resolver detects the speed of the motor and the absolute position (angle) of the rotor and transmits the information to a motor control unit (MCU), the motor control unit is capable of generating a torque command and a speed command of the motor. However, a resolver offset occurs due to various reasons such as an assembly tolerance of the resolver and coil position inaccuracy of the resolver. When the absolute position of the rotor are unable to be accurately measured due to this offset, the motor is unable to be normally driven.

Accordingly, in an eco-friendly vehicle, a resolver offset automatic correction mode is set. When the resolver offset automatic correction mode is executed, resolver offset correction is performed by a resolver offset determination unit in a zero torque period in which zero current control of the motor is possible. When zero current control is performed with respect to the motor, a voltage that corresponds to counter electromotive force is generated. Only a q-axis voltage is generated when offset correction is accurate and a d-axis voltage is also generated when offset correction is inaccurate. Therefore, offset correction may be performed using the level of the d-axis voltage. In addition, the resolver offset may be monitored while a vehicle is being driven to determine whether offset re-correction is necessary, and offset correction may be performed again upon determining that offset re-correction is necessary.

Accordingly, the resolver offset determination unit receives a torque command T*, current commands id* and iq*, currents id and iq fed back by the motor, and d-axis and q-axis voltages Vd* and Vq* monitored upon current control to determine a resolver offset and then performs resolver offset correction in a zero torque period in which zero current control of the motor is possible. However, torsional deformation occurs in the shaft in proportion to the torque generated in the shaft of the motor rotor. Additionally, angular deviation occurs in the resolver mounted on the shaft by an angle of torsion of the shaft occurring due to torsional deformation and, as a result, an error occurs in a corrected resolver offset and the offset correction may be inaccurate. In addition, motor output deviation occurs due to the resolver offset deviation caused by the torsion angle of the shaft of the motor rotor, thereby reducing the lifespan of the motor.

SUMMARY

The present invention provides a resolver offset correction device and method of an eco-friendly vehicle, which are capable of more accurately performing resolver offset correction by correcting the resolver offset in consideration of an angle of torsion occurring in a shaft or a motor rotor.

In one aspect, a resolver offset correction device of an eco-friendly vehicle may include a resolver offset determination unit configured to receive a torque command T*, an inverse magnetic flux $1/\lambda$, current commands id* and iq*, currents id and iq fed back by a motor, and d-axis and q-axis voltages Vd* and Vq* monitored upon current control to determine the resolver offset, and a torsion angle compensator configured to estimate a resolver offset deviation based on a torsion angle of a shaft of a motor rotor.

In an exemplary embodiment, resolver offset correction method of an eco-friendly vehicle may include performing, by a resolver offset determination unit, primary resolver offset correction, determining, by the resolver offset determination unit, a current resolver offset, determining, by the resolver offset determination unit, a level of a current torque command, estimating, by a torsion angle compensator, a resolver offset deviation when the level of the determined torque command is a nonzero value, and estimating the resolver offset deviation and then performing secondary resolver offset correction.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
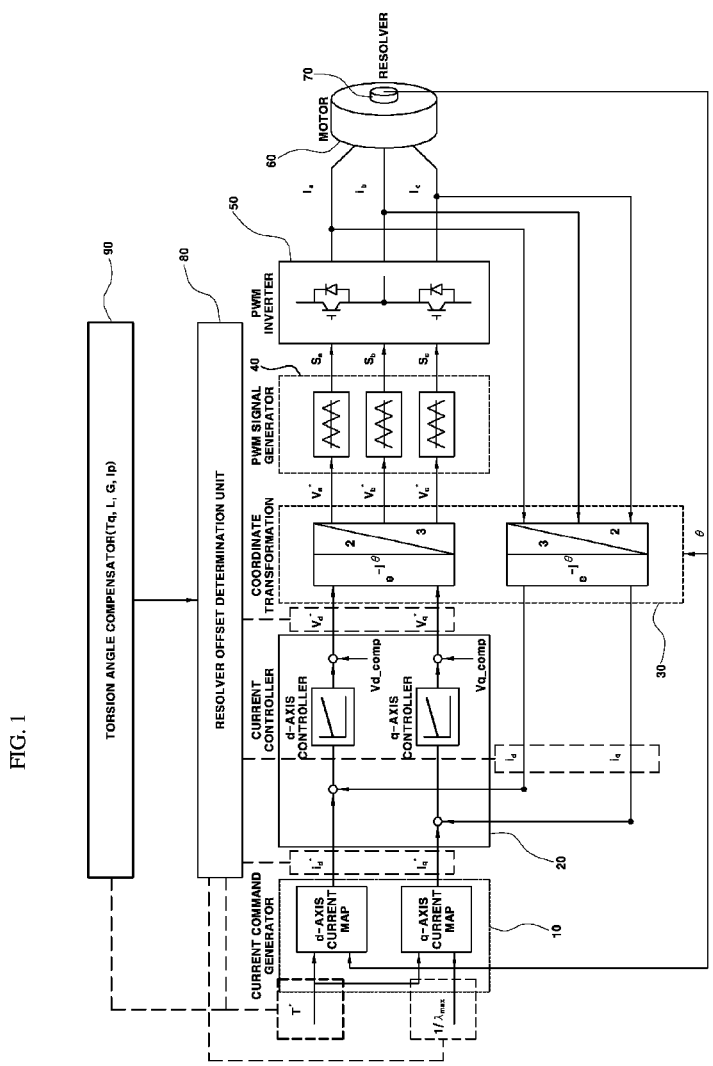
FIG. 1 is a view showing the configuration of a motor control device and a resolver offset correction device of an eco-friendly vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

FIG. 1 is a view showing the configuration of a motor control device and a resolver offset correction device of an eco-friendly vehicle according to the present invention. As shown in FIG. 1, the motor control device of the eco-friendly vehicle according to the present invention, that is, a motor control unit (MCU or motor controller), may include a current command generator 10, a current controller 20, a coordinate transformation unit 30, a signal generator 40, a pulse width modulation (PWM) inverter 50, a motor 60, a resolver 70 mounted on the shaft of the rotor of the motor 60, and a resolver offset determination unit 80 and a torsion angle compensator 90 as the resolver offset correction device.

In particular, the current command generator 10 may be configured to determine d-axis current and q-axis current based on a driving condition of a vehicle detected by a sensor. The current command generator 10 may include a d-axis current map and a q-axis current map stored therein. Accordingly, when a current motor torque T* and a speed ω required according to the driving of the vehicle are input to the current command generator 10, the current command generator 10 may be configured to calculate d-axis current id* and q-axis current iq* corresponding to the torque and the speed of the motor.

The current controller 20 may be configured to calculate a d-axis voltage Vd* and a q-axis voltage Vq* using the d-axis current id* and the q-axis current iq* received from the current command generator 10 and d-axis feedback current id and q-axis feedback current iq. The coordinate transformation unit 30 may be configured to receive the d-axis voltage Vd* and the q-axis voltage Vq* from the current controller 110 to transform the d-axis voltage Vd* and the q-axis voltage Vq* into three-phase alternating current (AC) voltages Va*, Vb* and Vc*, and may be configured to receive the three-phase AC currents ia, ib and ic applied to the motor 60 as feedback currents to transform the three-phase AC currents ia, ib and ic into the d-axis feedback current id and the q-axis feedback current iq.

The PWM signal generator 40 may be configured to receive the three-phase AC voltages Va*, Vb* and Vc* from the coordinate transform unit 30 to transform the three-phase AC voltages Va*, Vb* and Vc* into three-phase switching signals Sa, Sb and SC. The PWM inverter 50 may include a plurality of switching elements and may be configured to receive the three-phase switching signals Sa, Sb and Sc from the PWM signal generator 40 to transform the three-phase switching signals Sa, Sb and Sc into three-phase AC currents ia, ib and ic.

Further, the motor 60 may then be driven using the three-phase AC currents ia, ib and ic received from the PWM inverter 50, thereby operating the vehicle. Additionally, the resolver 70 may be mounted on the shaft of the rotor of the motor 60 to detect and transmit the absolute position (phase angle) of the rotor to the coordinate transformation unit 30 and the current command generator 10, thereby more accurately controlling the motor.

The resolver offset determination unit 80 may be configured to receive the torque command T*, an inverse magnetic flux 1/λ, the current commands id* and iq*, the currents id and iq fed back by the motor, and the d-axis and q-axis voltages Vd* and Vq* monitored upon current control and determine a resolver offset. Accordingly, the resolver offset determination unit 80 may include a speed/torque determination unit 81 (e.g., a speed sensor and a torque sensor), a zero current control determination unit 82 and a voltage sensing and resolver offset calculator 83 to perform resolver offset correction in a zero torque period in which zero (0) current control of the motor is possible.

Meanwhile, when torsional deformation occurs in the shaft in proportion to the torque generated on the shaft of the motor rotor, an angular deviation occurs in the resolver mounted on the shaft by an angle of torsion of the shaft generated due to torsional deformation, and, as a result, an error may occur in the corrected resolver offset. It was observed that, after restraining the shaft of the motor rotor in an actual motor dynamo tester, upon applying torque to the motor, the resolver angle was changed from about 0.746 rad to 0.7975 rad by change in the torsion angle of the shaft of the rotor and a deviation of about 2.95 deg occurs in the resolver offset in correspondence with the varied resolver angle (e.g., 0.0515 rad).

Figure 2:
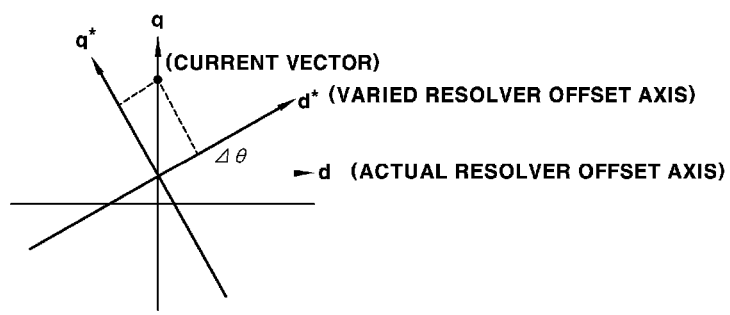
FIG. 2 is a graph showing a current vector value relative to a resolver offset axis before and after changing a resolver angle according to an exemplary embodiment of the present invention.

Referring to FIG. 2, since the current vector value q relative to the resolver offset axis d before resolver angle change may be different from the current vector value q' relative to the resolver offset axis d' after resolver angle change, resolver offset correction may not be accurately performed. In addition, under the assumption that a deviation of the resolver offset (angle) from a reference offset according to change in torsion angle of the shaft of the rotor is about 1 to 3 deg, the maximum torque and output per motor speed were measured.

Figure 3:
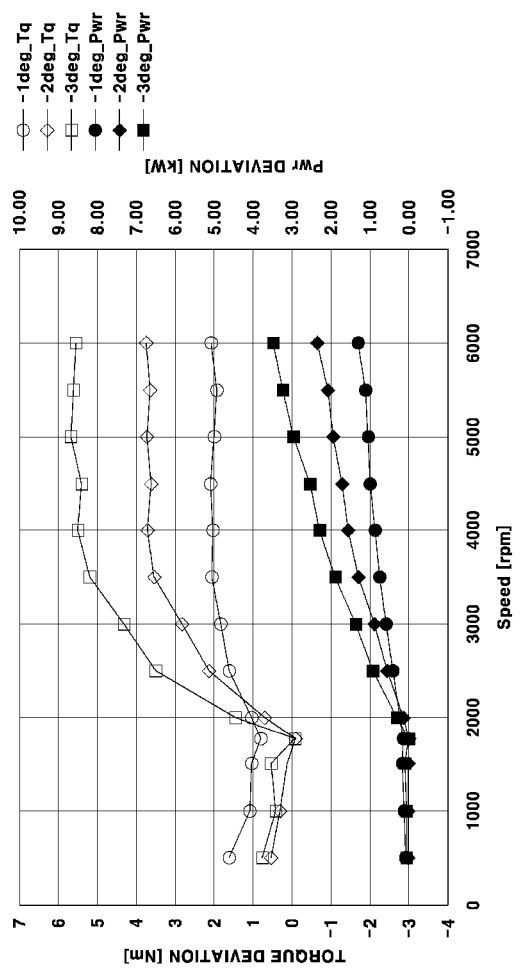
FIG. 3 is a test result graph showing a deviation in torque and output of a motor according to a resolver offset deviation according to an exemplary embodiment of the present invention.

Further, FIG. 3 shows that a deviation occurs in the torque and output of the motor according to the resolver offset deviation. Therefore, when the resolver angle varies according to torsional deformation of the shaft of the motor rotor, resolver offset correction is not accurately performed. Therefore, in the present invention, the resolver offset may be corrected based on the angle of torsion occurring in the shaft of the motor rotor, thereby more accurately performing resolver offset correction.

Figure 4:
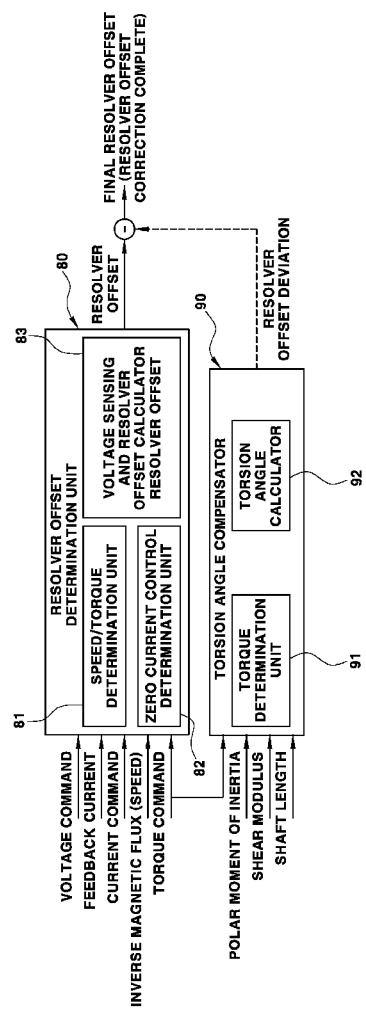
FIG. 4 is a view showing the configuration of a resolver offset correction device according to an exemplary embodiment of the present invention.

FIG. 4 is a view showing the configuration of a resolver offset correction device of an eco-friendly vehicle according to the present invention. The components of the device described below may be operated by an overall controller having a processor and a memory. Referring to FIG. 4, the resolver offset correction device of the present invention may include a torsion angle compensator 90 configured to output the resolver offset deviation based on the torsion angle of the shaft of the motor rotor, in addition to the resolver offset determination unit 80 having a speed/torque determination unit 81, a zero current control determination unit 82, and a voltage sensing and resolver offset calculator 83.

The torsion angle compensator 90 may include a torque determination unit 91 configured to receive the torque command T* input to the resolver offset determination unit 80 and determine a current torque command of a motor and a torsion angle calculator 92 configured to estimate and calculate the torsion angle Φ of the shaft of the motor rotor. The torsion angle compensator 90 may be configured to estimate and calculate the torsion angle of the shaft of the motor rotor and then output the resolver offset deviation based on the calculated torsion angle. The torsion angle compensator 90 may be configured to estimate the torsion angle through Equations 1 and 2 below.

$$\phi = \frac{TL}{GI_P}$$  Equation 1

In Equation 1, Φ denotes a torsion angle, T denotes a torque command, L denotes the length of a circular shaft of a motor rotor, G denotes the shear modulus of the circular shaft of the motor rotor, and $I_p$ denotes the polar moment of inertia of the circular shaft of the motor rotor.

The length and the shear modulus of the circular shaft may vary according to the type of the motor. The length of the circular shaft may be assumed to be 0.1 m and the shear modulus of the circular shaft is the shear modulus of steel.

$$I_P = \frac{\pi r^4}{2} = \frac{\pi d^4}{32}$$  Equation 2

Equation 2 is used to obtain the polar moment of inertia of Equation 1. In particular, in Equation 2, r denotes the radius of the circular shaft and d denotes the diameter of the circular shaft.

When the torsion angle Φ is calculated using Equation 1 in the torsion angle compensator 90, the length L of the circular shaft of the motor rotor, the shear modulus G of the circular shaft of the motor rotor and the polar moment $I_p$ of inertia of the circular shaft of the motor rotor have constant values and only the torque command T per motor speed varies. Accordingly, the torsion angle Φ calculated using Equation 1 in the torsion angle calculator 92 of the torsion angle compensator 90 varies in proportion to the level of the torque command T per motor speed input to the torque determination unit 91.

Subsequently, the torsion angle compensator 90 may be configured to calculate the torsion angle Φ varying according to the torque command T and then estimate the resolver offset deviation. A conducted test showed that a deviation occurs in the resolver offset (angle) based on a change in torsion angle of the shaft of the rotor and a deviation occurs in the torque and output of the motor based on the resolver offset deviation. Map data shown in Table 1 below may be stored in the torsion angle compensator 90.

TABLE 1

| Speed (RPM) | torsion angle (rad_m) | resolver offset deviation (deg_e) | torque deviation (Diff torque) | output deviation (diff_power) |
|---|---|---|---|---|
| 3000 | 0.00367 | 1.682202 | 2.52 | 0.79 |
| 3500 | 0.0030452 | 1.3958103 | 2.65 | 0.97 |
| 4000 | 0.0025919 | 1.1880331 | 2.35 | 0.98 |
| 4500 | 0.0022322 | 1.0231632 | 2.14 | 1.01 |

For example, when the torsion angle Φ varying according to the torque command T calculated in the torsion angle compensator 90 is 0.0030452 rad, the torque deviation of the motor is maximally estimated to be 5 Nm @3500 rpm and the resolver offset deviation is estimated to be 1.3958103 deg, through the above-described map data.

Alternatively, when the torsion angle Φ varying according to the torque command T calculated in the torsion angle compensator 90 is 0.0022322 rad, the torque deviation of the motor is maximally estimated to be 1.01 kW @4500 rpm and the resolver offset deviation is estimated to be 1.02316322 deg, through the above-described map data. Accordingly, the resolver offset deviation estimated by the torsion angle compensator 90 may be used to compensate for the resolver offset actually determined by the resolver offset determination unit.

Figure 5:
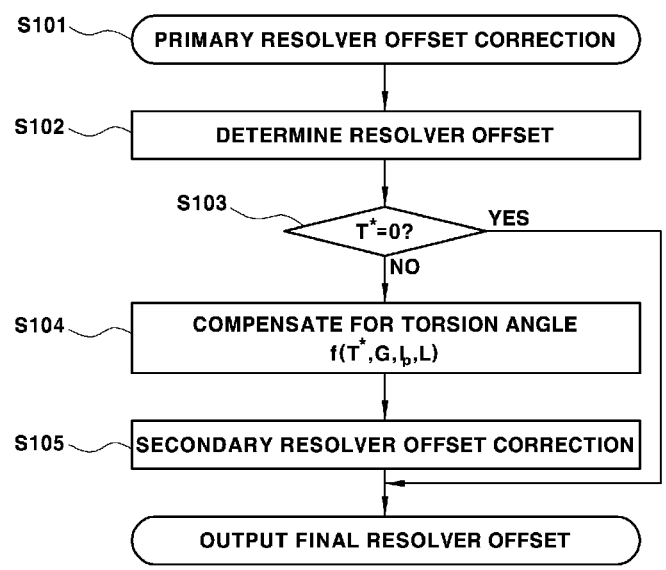
FIG. 5 is a flowchart illustrating a resolver offset correction method of an eco-friendly vehicle according to an exemplary embodiment of the present invention.

The resolver offset correction method performed based on the above configuration will now be described. FIG. 5 is a flowchart illustrating a resolver offset correction method of an eco-friendly vehicle according to the present invention. The method described herein below may be executed by an overall controller having a processor and a memory.

First, the resolver offset determination unit 80 may be configured to perform primary resolver offset correction (S101). In other words, the resolver offset determination unit 80 may be configured to receive the torque command T*, the inverse magnetic flux 1/λ, the current commands id* and iq*, the currents id and iq fed back by the motor, and the d-axis and q-axis voltages Vd* and Vq* monitored upon current control and perform primary resolver offset correction in a zero torque period in which zero current control of the motor is possible.

Subsequently, the resolver offset determination unit 80 may be configured to determine a current resolver offset (S102). Accordingly, the resolver offset determination unit 80 may be configured to determine the level of the current torque command (S103). When the level of the torque command is a zero value, since shaft torsion does not occur and a resolver offset does not vary, the resolver offset determined in S102 may be output as a final resolver offset (S106). When the level of the torque command is a nonzero value, the resolver offset may be determined to be inaccurately corrected and the resolver offset deviation may be estimated by the torsion angle compensator 90 (S104).

In step S104, the torsion angle compensator 90 may be configured to estimate the torsion angle using Equations 1 and 2 above. When the torsion angle Φ is calculated using Equations 1 and 2 in the torsion angle compensator 90, the length L of the circular shaft of the motor rotor, the shear modulus G of the circular shaft of the motor rotor and the polar moment $I_p$ of inertia of the circular shaft of the motor rotor have constant values and only the torque command T per motor speed varies. Accordingly, the torsion angle Φ calculated in the torsion angle calculator 92 of the torsion angle compensator 90 varies in proportion to the level of the torque command T per motor speed input to the torque determination unit 91.

Subsequently, the torsion angle compensator 90 may be configured to calculate the torsion angle Φ varying according to the torque command T and then estimate the resolver offset deviation using the map data. After the resolver offset deviation according to the torsion angle of the shaft of the motor rotor is estimated in step S104, secondary resolver offset correction may be performed (S105). In particular, secondary resolver offset correction may be performed to correct the current resolver offset determined in step S102 to an accurate offset after primary correction in step S101, and may be performed by subtracting the resolver offset deviation according to the torsion angle of the shaft of the motor rotor estimated in step S104 from the current resolver offset determined in step S102. Finally, the resolver offset corrected in the secondary resolver offset correction step may be output as a final resolver offset (S105). The motor control unit may thus be configured to operate the motor using the final resolver offset.

The present invention provides the following effects. When the offset correction of the resolver for detecting the position of the rotor of the motor mounted on the eco-friendly vehicle is performed, the resolver offset may be corrected based on the angle of torsion occurring in the shaft of the motor rotor, thereby performing more accurate resolver offset correction and improving reliability and accuracy of motor control. In addition, since accurate resolver offset correction is performed based on the angle of torsion occurring in the shaft of the motor rotor, the desired output of the motor may be obtained without deviation and thus greater motor output than normal output may be prevented and durability of the motor may be improved.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A resolver offset correction device of an eco-friendly vehicle, the resolver offset correction device, comprising:
a resolver offset determination unit configured to receive a torque command T*, an inverse magnetic flux 1/λ, current commands id* and iq*, currents id and iq fed back by a motor, and d-axis and q-axis voltages Vd* and Vq* monitored upon current control to determine the resolver offset; and
a torsion angle compensator configured to estimate a resolver offset deviation based on a torsion angle of a shaft of a motor rotor for the motor to be operated based on the resolver offset deviation.

2. The resolver offset correction device of claim 1, wherein the torsion angle compensator includes:
a torque determination unit configured to receive the torque command T* input to the resolver offset determination unit to determine a current torque command of the motor; and
a torsion angle calculator configured to calculate a torsion angle Φ of the shaft of the motor rotor and then estimate and output the resolver offset deviation based on the calculated torsion angle.

3. The resolver offset correction device of claim 2, wherein the torsion angle compensator is configured to calculate the torsion angle Φ of the shaft of the motor rotor by:

$$\phi = \frac{TL}{GI_P}$$

wherein, Φ denotes a torsion angle, T denotes a torque command, L denotes a length of a circular shaft of a motor rotor, G denotes the shear modulus of the circular shaft of the motor rotor, and $I_p$ denotes a polar moment of inertia of the circular shaft of the motor rotor.

4. A resolver offset correction method of an eco-friendly vehicle, the resolver offset correction method, comprising:
performing, by a resolver offset determination unit, primary resolver offset correction;
determining, by the resolver offset determination unit, a current resolver offset;

determining, by the resolver offset determination unit, a level of a current torque command;

estimating, by a torsion angle compensator, a resolver offset deviation when the determined level of the torque command determined is a nonzero value; and estimating, by the torsion angle compensator, the resolver offset deviation and then performing secondary resolver offset correction to operate a motor of the vehicle based on the resolve offset deviation.

5. The resolver offset correction method of claim 4, wherein the primary resolver offset correction is performed in a zero torque period in which zero current control of the motor is possible, when the resolver offset determination unit receives a torque command T*, an inverse magnetic flux 1/λ, current commands id* and iq*, currents id and iq fed back by a motor, and d-axis and q-axis voltages Vd* and Vq* monitored upon current control.

6. The resolver offset correction method of claim 4, wherein when the level of the torque command is a zero value, the resolver offset is output as a final resolver offset.

7. The resolver offset correction method of claim 4, further comprising:

calculating, by the torsion angle compensator, a torsion angle Φ varying according to a torque command T; and estimating, by the torsion angle compensator, the resolver offset deviation using map data.

8. The resolver offset correction method of claim 7, wherein the torsion angle Φ of the shaft of the motor rotor is calculated by:

$$\phi = \frac{TL}{GI_P}$$

wherein, Φ denotes a torsion angle, T denotes a torque command, L denotes a length of a circular shaft of a motor rotor, G denotes the shear modulus of the circular shaft of the motor rotor, and $I_p$ denotes a polar moment of inertia of the circular shaft of the motor rotor.

9. The resolver offset correction device of claim 4, wherein the secondary resolver offset correction is performed by subtracting the resolver offset deviation according to the estimated torsion angle of the shaft of the motor rotor from the determined current resolver offset.

* * * * *